3,047,495
CORROSION INHIBITORS AND METHODS OF PREPARATION AND USE THEREOF

Willard H. Kirkpatrick, Sugar Land, and Virgil L. Seale and Harold C. Noe, Jr., Houston, Tex., assignors to Nalco Chemical Company, a corporation of Delaware
No Drawing. Filed Aug. 17, 1956, Ser. No. 604,608
11 Claims. (Cl. 252—8.55)

This invention in general relates to the inhibition or prevention of corrosion of metals and to compositions for use therein and, in particular, to compositions for use in preventing corrosion of ferrous metals.

The corrosion-inhibiting compositions of our invention differ from those usually offered in the corrosion field in that they are moldable solids which can be shaped into stick form of essentially 100% active material. The usual corrosion inhibitors heretofore offered have been liquid or when stick form have been distributed in a paraffin, resin or asphaltic binder. These binders are generally inert and as a result the stick chemicals contain only a portion, often 50% or less, of active corrosion-inhibiting substances. We have developed a series of anti-corrosion chemicals which may be molded in stick form of substantially 100% active material. The corrosion inhibitors contemplated herein are adapted for use in the prevention of corrosion of pipe or equipment which is in contact with a corrosive oil-containing medium as, for example, in oil wells producing corrosive oil or oil-brine mixtures, in refineries and the like.

It is, therefore, an object of the present invention to provide compositions having anti-corrosion activity. A further object is to provide methods for producing and using compositions having anti-corrosion activity. Other objects will be apparent to one skilled in the art from the following detailed description.

The compositions of our invention may be defined generally as basic amine salts of the reaction product of polyoxyethylene glycol chloride and partial amides of alkylene polyamines and higher aliphatic acids. They are prepared by partial amidation of alkylene polyamines including polyalkylene polyamines and higher molecular weight fatty acids as the free acid or esters thereof and thereafter reacted with polyethylene glycol chloride. Polyamines which are readily available as raw materials to produce the partial amides include ethylene diamine, diethylene triamine, tetraethylene pentamine and triethylenetetramine. Other suitable polyamines include propylene diamine, dipropylene triamine, 1,3 diamino butane and the like. They are considered as members of the broad class of alkylene polyamines. Ordinarily the word "polyamine" is employed to include diamines, as well as amines having three or more nitrogens.

The higher aliphatic acids which may be employed to produce the compositions of the present invention are principally those derived from animal, vegetable and marine fats, the more common being lauric, myristic, palmitic, stearic, arachadic, behenic, ricinoleic, palmitoleic, oleic, linoleic, linolenic and erucic acids. The acids of the composition of our invention may be any one of the foregoing acids or mixtures of higher fatty acids as they are derived from animal or vegetable sources, for example, lard, coconut oil, cottonseed oil, soybean oil, rapeseed oil, sesame oil, palm oil, palm kernel oil, menhaden oil, castor oil, etc.

The processes whereby the compositions of the present invention are produced involve essentially two steps: (1) partial amidation of an alkylene polyamine and the aliphatic acid or ester thereof in a ratio of at least one mol of amino nitrogen per mol equivalent of fatty acid, and (2) reaction of at least one amino group with polyethylene glycol chloride to produce an amine salt thereof without completely neutralizing the basic character of the composition. While our compositions may be made from the free acids, we prefer to react a triglyceride with the polyamine. It is preferred that a portion of the acids be unsaturated because they appear to impart plasticity to the solid products of our invention. Those produced from essentially completely saturated acids such as those of hydrogenated tallow tend to form a more hard, friable product.

The melting point of the anti-corrosion sticks is an important factor and should not greatly exceed the temperatures prevailing at the point of ultimate use of the invention such as in a well bore. We may control the melting point of the compositions herein disclosed by increasing the polyamine content to obtain a product of lower melting point and, conversely, lowering the polyamine content to obtain a higher melting point. The compositions of our invention have a general melting point ranging between 145° F. and 240° F.

As aforesaid, polyethylene glycol chloride is reacted with a residual free amino hydrogen of the partial amides. The terminal free hydroxyl group of the polyoxyethylene radical imparts a degree of water-solubility to our compositions and also reduces the tendency of this type of product to form objectionable emulsions of water and oil. The amine salt is also less brittle than the partial amide per se. We have found that polyethylene glycol chlorides having an average molecular weight between about 200 and 800 are suitable for purposes of our invention.

In the preferred embodiment of our invention amidation involves reaction of at least one mol of amino nitrogen in the alkylene polyamine, preferably 1.25 or more mols, per mol equivalent of the aliphatic acids of a triglyceride. We prefer that at least a small amount, e.g., three percent to twenty percent, of the acids be unsaturated such as those of soybean oil. A partial amide is formed by heating the mixture under agitation to a temperature in the range of about 130–200° C. and are held at that temperature under agitation for a substantial period, generally one hour or more. The reaction mixture is then cooled below 100° C. and polyethylene glycol chloride is added slowly with vigorous stirring. The reaction is noticeably exothermic. After addition is complete, the temperature is raised above about 130° C. and agitation is continued at this temperature for at least an hour more. The product is then cooled and cast into a suitable mold to give a solid in the shape of a stick, for example. The amidation step wherein the free acid rather than the glyceryl ester is used is substantially the same.

Our invention may be further understood from the following examples which are provided as illustrations of embodiments of the instant invention and hence should not be construed as being limitative of the invention as herein defined in the appended claims.

Example I

In a suitable reaction vessel provided with means for agitation and external heating, 350 parts of hydrogenated tallow was heated to the melting point and 50 parts of diethylene triamine was added slowly at 96° C. The temperature was elevated to 145° C. and held at that point for two hours. The reaction mass was cooled to 90° C. and 40 parts of polyethylene glycol chloride having an average molecular weight of 600 was added slowly with vigorous stirring. After addition was complete the temperature was raised to 145° C. and held at that point for one hour. When the mixture was cooled to 110° C. it was poured into suitable molds. The cooled product is a brittle solid.

Example II

Following the procedure of Example I, 250 parts of hydrogenated tallow and 125 parts of soybean oil were heated to 60° C. at which point a fluid mixture results. To the well agitated mixture there was added 65 parts of diethylene triamine, and the temperature was raised to 140° C. After three hours of heating at 140° C., the mixture was cooled to 110° C. At this point 50 parts of polyethylene glycol chloride (average molecular weight 600 was added slowly with stirring. The temperature was again raised to 140° C. and held there for 1.5 hours. The product was cooled and cast into a suitable mold to yield a soft, waxy solid at room temperature.

*Example III*

Following the procedure of Example II, 250 parts of hydrogenated tallow and 125 parts of soybean oil were heated above the melting point of the mixture. To the well stirred mixture there was added 75 parts of a crude polyamine comprising a mixture of 25% diethylene triamine and 75% of higher polyalkylene polyamine homologs beginning with tetraethylene pentamine. The reaction mass is then heated to 140° C. for three hours. After cooling to 110° C., 50 parts of polyethylene glycol chloride (average molecular weight 400) is added carefully to avoid overheating. The temperature is then raised to 140° C. and held at that point for one hour. After cooling slightly, the mass is poured into suitable molds to form waxy solids of the desired shape.

*Example IV*

In a small reaction vessel provided with a source of internal agitation and external heating, there is charged 350 parts of hydrogenated tallow and 35 parts of soybean oil. Heating is applied until the mass is completely liquefied. Agitation is commenced and 70 parts of diethylene triamine are added slowly. The agitation and heating are continued until a temperature of 140° C. is reached. After maintaining the temperature for two hours at this point, 50 parts of a polyethylene glycol chloride (average molecular weight 600) is added cautiously. Agitation is continued for one hour at 140° C. The mass is cooled to 100–105° C. and carefully maintained in this range while discharging the reaction vessel into molds having a diameter of 1 7/16" and a length of 18". The molded sticks have a melting point between 190 and 195° F.

*Example V*

There is charged into a reaction vessel 400 pounds of hydrogenated fish oil glyceride and 15 pounds of soybean oil. The kettle is heated until the ingredients are melted. To the well agitated mixture is added 75 pounds of diethylene triamine. The heating and agitation are continued until a temperature of 150° C. is reached and is held at that point for two hours. To this reaction mass there is added 50 pounds of polyethylene glycol chloride (average molecular weight 600) and the temperature is held at 150° C. for an additional hour.

The product is then cooled and while maintaining agitation is withdrawn from the reaction vessel into a stick-like mold having a diameter of 1 7/16" and a length of 18". The finished material has a melting range of 220–225° F.

The following tests illustrate the use of the compositions of our invention.

FIELD SCALE TEST NO. 1

In a Louisiana gas distillate field, stick corrosion inhibitors as exemplified by the product of Example IV were placed on test. The well was making approximately 4.5 million cubic feet of gas per day with 40 barrels of distillate.

Corrosion coupons were installed in the well head after treatment with the chemical stick inhibitor. After 15 days exposure there was no measurable weight loss. This test was repeated for another 15 days and, again, there was no measurable weight loss—an indication that corrosion inhibition approached 100%.

FIELD SCALE TEST NO. 2

In a New Mexico field test coupons were inserted at the well head prior to commencing treatment with a chemical stick inhibitor of the present invention. A six-day test indicated that corrosion was occurring at an average rate of 4.65 MPY. A chemical stick inhibitor of the type exemplified in Example IV was used to treat the well, and the effectiveness of the treatment was measured by test coupons in a manner similar to the blank test. After 15 days exposure the test coupons were removed and weighed, and the results indicated an average corrosion rate loss of 0.38 MPY. This is equivalent to about 90% corrosion inhibition.

In most instances it is desired that the stick corrosion inhibitors have a specific gravity substantially in excess of 1.0. This is accomplished by incorporating into the stick formulation weighting material such as barium sulfate, lead oxide, iron oxide, etc. The compositions as described herein lend themselves to the incorporation of weighting materials. It is obvious that the weighted sticks contain inactive corrosion inhibiting materials to the extent of the amount of weighting materials so incorporated.

The invention is hereby claimed as follows:

1. A corrosion inhibiting composition comprising in stick form, a basic amine salt composed of the reaction products resulting from the reaction between polyethylene glycol chloride having an average molecular weight in the range of about 200–800 and an amino hydrogen of a partial amide of a polyalkylene polyamine having terminal primary amino groups and 2–3 carbons per alkylene group and higher molecular weight fatty acids, said amine salt having a melting point within the range of 145–240° F. and a sufficient quantity of an inorganic weighting material to provide a specific gravity for the stick substantially in excess of 1.0.

2. A corrosion inhibiting composition comprising, in stick form, a basic amine salt composed of the reaction products resulting from the reaction between polyethylene glycol chloride having an average molecular weight in the range of about 200–800 and an amino hydrogen of a partial amide of diethylene triamine and higher molecular weight fatty acids, said amine salt having a melting point within the range of 145–240° F. and a sufficient quantity of an inorganic weighting material to provide a specific gravity for the stick substantially in excess of 1.0.

3. A corrosion inhibiting composition consisting of, in stick form, a basic amine salt composed of the reaction products resulting from the reaction between polyethylene glycol chloride having an average molecular weight in the range of about 200–800 and an amino hydrogen of a partial amide of a polyalkylene polyamine having terminal primary amino groups and 2–3 carbons per alkylene group and higher molecular weight fatty acids, said amine salt having a melting point within the range of 145–240° F., the fatty acids comprising 3 to 20% unsaturated acids, and a sufficient quantity of an inorganic weighting material to provide a specific gravity for the stick substantially in excess of 1.0.

4. A corrosion inhibiting composition consisting of, in stick form, a basic amine salt composed of the reaction products resulting from the reaction between polyethylene glycol chloride having an average molecular weight in the range of about 200–800 and an amino hydrogen of a partial amide of diethylene triamine and higher molecular weight fatty acids, said amine salt having a melting point within the range of 145–240° F., the fatty acids comprising 3 to 20% unsaturated acids, and a sufficient quantity of an inorganic weighting material to provide a specific gravity for the stick substantially in excess of 1.0.

5. A corrosion inhibiting composition comprising, in stick form, a basic amine salt composed of the reaction products resulting from the reaction between polyethylene glycol chloride having an average molecular weight in the range of 200–800 and an amino hydrogen of a partial amide of higher molecular weight fatty acids and an amino compound selected from the group consisting of ethylene diamine, propylene diamine, and a polyalkylene polyamine having terminal primary amino groups and 2–3 carbons per alkylene group, said amine salt having a melting point within the range of 145–240° F., and a sufficient quantity of an inorganic weighting material to provide a specific gravity for the stick substantially in excess of 1.0.

6. In a process for recovering from a well containing ferrous metal components a member from the group consisting of a liquid hydrocarbon, a gaseous hydrocarbon, and mixtures thereof, the improvement which comprises protecting against corrosion ferrous metal surfaces in said well in contact with said hydrocarbons by adding to said well a corrosion inhibiting composition comprising a basic amine salt composed of the reaction products resulting from the reaction between polyethylene glycol chloride having an average molecular weight in the range of about 200–800 and an amino hydrogen of a partial amide of higher molecular weight fatty acids and an amine selected from the group consisting of ethylene diamine, propylene diamine and polyalkylene polyamines having terminal primary amino groups and 2–3 carbons per alkylene group, said amine salt having a melting point within the range of 145–240° F.

7. In a process for recovering from a well containing ferrous metal components a member from the group consisting of a liquid hydrocarbon, a gaseous hydrocarbon, and mixtures thereof, the improvement which comprises protecting against corrosion ferrous metal surfaces in said well in contact with said hydrocarbons by adding to said well a corrosion inhibiting composition comprising a basic amine salt composed of the reaction products resulting from the reaction between polyethylene glycol chloride having an average molecular weight in the range of about 200–800 and an amino hydrogen of a partial amide of higher molecular weight fatty acids and polyalkylene polyamines having terminal primary amino groups and 2–3 carbons per alkylene group, said amine salt having a melting point within the range of 145–240° F.

8. In a process for recovering from a well containing ferrous metal components a member from the group consisting of a liquid hydrocarbon, a gaseous hydrocarbon, and mixtures thereof, the improvement which comprises protecting against corrosion ferrous metal surfaces in said well in contact with said hydrocarbons by adding to said well a corrosion inhibiting composition comprising a basic amine salt composed of the reaction products resulting from the reaction between polyethylene glycol chloride having an average molecular weight in the range of about 200–800 and an amino hydrogen of a partial amide of higher molecular weight fatty acids and an amine selected from the group consisting of ethylene diamine, propylene diamine and diethylene triamine, said amine salt having a melting point within the range of 145–240° F.

9. A process for protecting ferrous metal surfaces against the corrosive action of an oil-brine mixture which comprises contacting said ferrous metal surfaces which are exposed to said oil-brine mixture with a composition comprising a basic amine salt composed of the reaction product resulting from the reaction between polyethylene glycol chloride having an average molecular weight in the range of about 200–800 and an amino hydrogen of a partial amide of higher molecular weight fatty acids and an amino compound selected from the group consisting of ethylene diamine, propylene diamine and polyalkylene polyamines having terminal primary amino groups and 2–3 carbons per alkylene group, said amine salt having a melting point within the range of 145–240° F.

10. A process for protecting ferrous metal surfaces against the corrosive action of an oil-brine mixture which comprises contacting said ferrous metal surfaces which are exposed to said oil-brine mixture with a composition comprising a basic amine salt composed of the reaction product resulting from the reaction between polyethylene glycol chloride having an average molecular weight in the range of about 200–800 and an amino hydrogen of a partial amide of higher molecular weight fatty acids and polyalkylene polyamines having terminal primary amino groups and 2–3 carbons per alkylene group, said amine salt having a melting point within the range of 145–240° F.

11. A process for protecting ferrous metal surfaces against the corrosive action of an oil-brine mixture which comprises contacting said ferrous metal surfaces which are exposed to said oil-brine mixture with a composition comprising a basic amine salt composed of the reaction product resulting from the reaction between polyethylene glycol chloride having an average molecular weight in the range of about 200–800 and an amino hydrogen of a partial amide of higher molecular weight fatty acids and diethylene triamine, said amine salt having a melting point within the range of 145–240° F.

References Cited in the file of this patent

UNITED STATES PATENTS

| | | |
|---|---|---|
| 2,085,706 | Schoeller et al. | June 29, 1937 |
| 2,103,872 | Schoeller et al. | Dec. 28, 1937 |
| 2,282,702 | Bock | May 12, 1942 |
| 2,525,771 | Cook et al. | Oct. 17, 1950 |
| 2,564,758 | Haggard | Aug. 21, 1951 |
| 2,598,213 | Blair | May 27, 1952 |
| 2,609,931 | Rodman et al. | Sept. 9, 1952 |
| 2,668,165 | Carpenter | Feb. 2, 1954 |
| 2,681,354 | Kelley et al. | June 15, 1954 |
| 2,854,324 | Shen et al. | Sept. 30, 1958 |
| 2,901,430 | Chiddix et al. | Aug. 25, 1959 |

OTHER REFERENCES

McCutcheon: "Synthetic Detergents," 1950, page 177.